United States Patent [19]

Mikeska

[11] Patent Number: 4,496,334
[45] Date of Patent: Jan. 29, 1985

[54] GUARD FOR A DRIVE SHAFT
[75] Inventor: Felix Mikeska, Siegburg, Fed. Rep. of Germany
[73] Assignee: Jean Walterscheid GmbH, Lohmar, Fed. Rep. of Germany
[21] Appl. No.: 471,786
[22] Filed: Mar. 3, 1983
[30] Foreign Application Priority Data
Mar. 10, 1982 [DE] Fed. Rep. of Germany ....... 3208541
[51] Int. Cl.³ ................................................. F16D 3/84
[52] U.S. Cl. .................................... 464/175; 464/901
[58] Field of Search ................. 277/212 FB; 464/171, 464/172, 173, 175, 182, 901

[56] References Cited
U.S. PATENT DOCUMENTS 3,344,618 10/1967 Young .............................. 464/172 X
3,703,089 11/1072 Geisthoff et al. ................ 464/175 X
4,107,952 8/1978 Geisthoff ............................ 464/175
4,411,636 10/1983 Buthe et al. .......................... 464/172

FOREIGN PATENT DOCUMENTS 1266571 4/1968 Fed. Rep. of Germany .
2402726 9/1974 Fed. Rep. of Germany .
1011521 12/1965 United Kingdom .
1566735 5/1980 United Kingdom .
2079886 1/1982 United Kingdom ................ 464/175

Primary Examiner—Stuart S. Levy
Assistant Examiner—Daniel P. Stodola
Attorney, Agent, or Firm—Toren, McGeady and Stanger

[57] ABSTRACT

A guard for a combination rotary drive shaft and universal joint includes a tubular member surrounding the shaft and a funnel-shaped member laterally enclosing the joint. An intermediate member interconnects the tubular member and the funnel shaped member. A bearing ring is engageable within one of the drive shaft and the universal joint and mounts the guard on the shaft and joint. To assemble the guard on the shaft and joint it is axially movable along the shaft with passageways formed by the intermediate member and the funnel-shaped member arranged to align with and move over outwardly extending locking tongues on the bearing ring. When a stop surface of the intermediate member contacts the locking tongues on the bearing ring further axial movement is blocked and the guard can be secured in position by rotating the funnel-shaped member so that the locking tongues are spaced angularly from the passageways in the funnel-shaped member.

7 Claims, 6 Drawing Figures

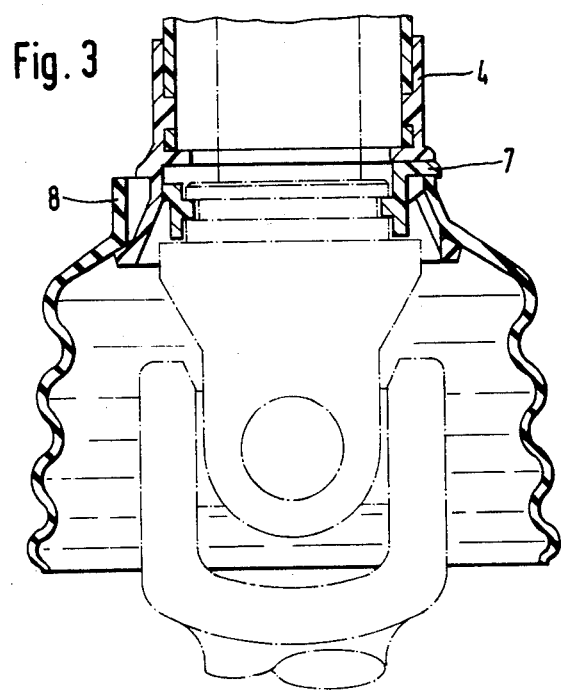
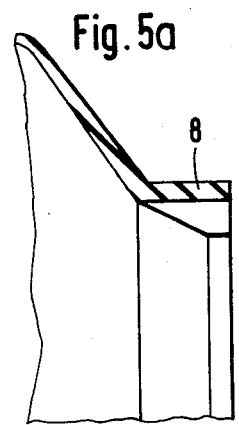
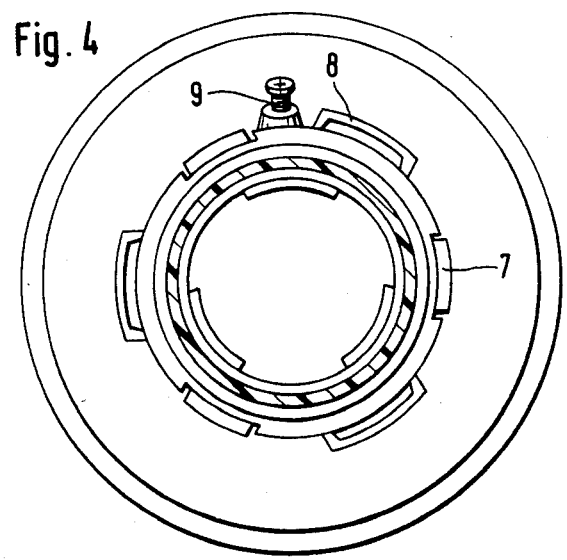
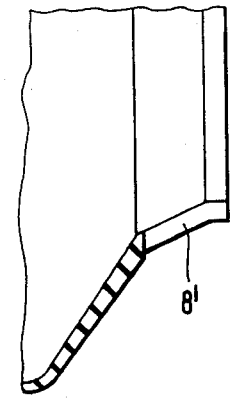

GUARD FOR A DRIVE SHAFT

SUMMARY OF THE INVENTION

The present invention is directed to a guard for a drive shaft and the guard is formed of a number of interconnected tubular parts mounted for movement relative to the shaft. A bearing ring with radially outwardly extending locking tongues is secured into the shaft or to a universal joint connected to the shaft. The tubular guard is shaped so that it can be moved axially over the locking tongues on the bearing ring until the bearing ring contacts a stop surface on the guard. The stop surface is located on an intermediate tubular member located between a tubular member enclosing the drive shaft and a funnel-shaped member enclosing the joint.

In a known guard device disclosed in British patent specification 1 566 735 a bearing ring is provided with radially outwardly directed locking tongues and an intermediate part of the guard includes apertures corresponding to the locking tongues. In this guard, the divided bearing ring is inserted into a circular groove in the drive shaft. Subsequently, the intermediate part is pushed axially over the bearing ring for securing it in the circular groove. The bearing ring is secured relative to the intermediate part by sliding a protective funnel-shaped member over the intermediate part so that it is held by a certain pretension. Preferably, the funnel-shaped member is heated in hot water or in some similar manner so that it is easily slid into position over stops on the intermediate part and the radially outwardly projecting tongues without overexpanding the connecting sleeve forming the connection to the intermediate part.

There is the disadvantage in this particular guard that if a dismantling operation is necessary, such as replacing the cross-member including its needle bearing bushes covered by the funnel-shaped member, it is not possible to recognize the manner in which the intermediate part and the funnel-shaped member are assembled together. Further, it is difficult to heat the connecting sleeve of the funnel-shaped member in a suitable way. A person carrying out the disassembly operation is forced to use tools, such as screwdrivers or similar tools, to expand the funnel-shaped member and lift it, by applying force, over the locking tongues and the stops on the intermediate part.

In another known drive shaft guard disclosed in the British patent specification 1,011,521, the guard is supported on the drive shaft by a rolling element bearing with an axially split outer race with one part held by a spring and having outwardly extending projections provided with gripping knobs. To remove the guard from the drive shaft, the gripping knobs must be used to axially move the bearing-race part a sufficient distance for the rolling members to escape. The manner of operation of this type of guard is not readily recognizable to persons not familiar with it.

Still another guard arrangement is disclosed in German Offenlegungsschrift 2 402 726 in which a holding ring is connected to the funnel-shaped member by eccentric knobs or turn buttons. This arrangement has the disadvantage that, due to vibrations occurring in the drive shaft, especially when the joint is articulated, the buttons may turn and release the connection. Again, with this arrangement a person unfamiliar with it will not be able to easily recognize how to dismantle the guard.

Therefore, it is the primary object of the present invention to provide a guard device which is securely held to the drive shaft, but the manner in which it is dismantled can be easily recognized.

In accordance with the present invention, a protective funnel-shaped member is located in the region of the intermediate member or connecting sleeve and it is provided with shaped portions forming passageways which can be positioned to correspond with locking tongues on the bearing ring. In the assembled position on the drive shaft, the funnel-shaped member can be held non-rotatably on the intermediate member with the passageways in the funnel-shaped member spaced angularly from the locking tongues on the bearing ring.

One advantage of the invention is that the shaped portions of the funnel-shaped member and their angular displacement relative to the locking tongues on the bearing ring should be obvious to anyone dismantling the guard so that he would readily recognize that it is only necessary to rotate the funnel-shaped member until its shaped portion is aligned with the locking tongue to dismantle the guard.

Another feature of the invention is that the shaped portions are in the form of outwardly extending sections in a connecting portion of the funnel-shaped member with the advantage that the strength of the connecting portion is retained in spite of the presence of the passageways formed.

Alternatively, the passageways may be defined by slots which extend through the connecting sleeve of the funnel-shaped member into the funnel-shaped part. With this arrangement existing funnel-shaped members for use in a different type of guard may be modified for use in accordance with the present invention.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3 is a section similar to that in FIG. 1, however, illustrating the guard in the assembled condition;

FIG. 4 is a transverse view of the guard illustrated in FIG. 3;

FIG. 5a is a section through a part of the guard illustrating one embodiment of the invention; and FIG. 5b is a section through a part of the guard illustrating another embodiment of the invention.

DETAIL DESCRIPTION OF THE INVENTION

Figure 1:
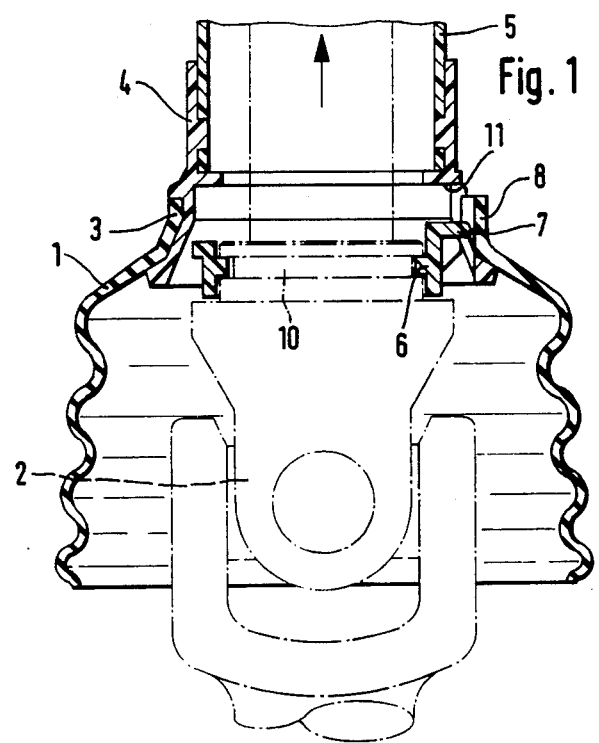
FIG. 1 is a longitudinal or axially extending section through a portion of a guard embodying the present invention and illustrated in position ready to be assembled.

In FIG. 1 a drive shaft is shown in phantom including a universal joint at one end. A guard encloses the joint 2 and the drive shaft and includes a funnel-shaped member 1 terminating at its upper end as viewed in FIGS. 1 and 3 in a connecting sleeve 3. An intermediate tubular member or connector part 4 interconnects the connecting sleeve 3 of the funnel-shaped member with the adjacent end of a tubular member 5 which laterally encloses the drive shaft. Further, the guard includes a bearing ring 6 seated within a circular groove 10 located in the drive shaft or the universal joint 2. The parts forming the guard are generally coaxial with the drive shaft. The bearing ring 6 is provided with a number of angularly spaced radially outwardly extending tongues 7, note FIG. 2.

Figure 2:
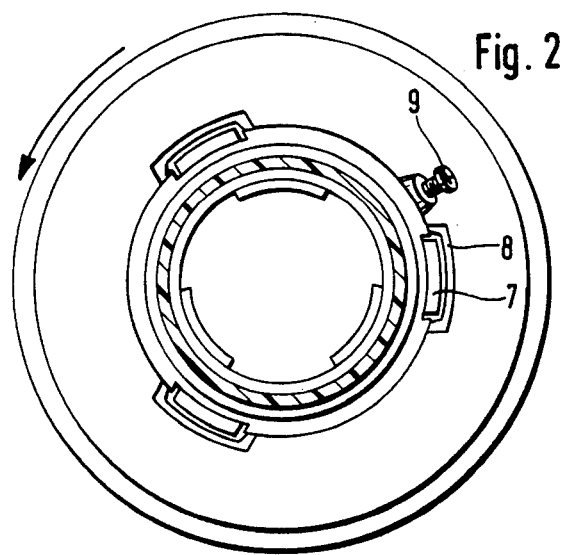
FIG. 2 is a view taken transversely of the section shown in FIG. 1.

As can be seen in FIG. 2, the connecting sleeve 3 on the funnel-shaped member 1 has angularly spaced outwardly extending projections 8 forming passageways aligned with the locking tongue 7 on the bearing ring 6. In addition, slots are formed in the intermediate part 4 so that the combination of the slots and the passageways defined by the projections 8 permit movement of the guard in the axial direction over the locking tongues 7, note FIG. 2.

To assemble the guard on the drive shaft and the joint 2, initially, the bearing ring 6 is seated into the annular groove 10. The guard is formed by the assembly of the funnel-shaped member 1, the connector part 4 and the tubular member 5. This assembly is moved in the axial direction over the bearing member 6 until the surface of the locking tongues 7 facing toward the drive shaft contact a stop surface 11 formed on the connector part 4. The passageways formed by the outwardly directed projections 8 in the connecting sleeve 3 of the funnel-shaped member 1 permit relative movement of the funnel-shaped member over the tongues. The position of the locking tongues 7 aligned with the passageways within the outwardly directed projections is illustrated in FIG. 2.

With the axial movement of the guard assembly completed by the contact between the stop surface 11 and the locking tongues 7, the funnel-shaped member 1 is rotated angularly about the axis of the shaft relative to the connector part 4 angularly displacing the locking tongues out of alignment with the passageways formed by the projections 8. This position of the guard can be clearly seen in FIG. 4. Accordingly, the bearing member is secured against axial displacement relative to the remainder of the guard assembly. A bolt 9 or a cam member, not shown, located on the connector part 4 engages in a recess in the sleeve portion 3 of the funnel-shaped member 1 and prevents any rotation of the funnel-shaped member from this assembled position.

In FIG. 5a the outwardly extending projections 8 forming the passageways through which the locking tongues 7 can be moved axially during assembly of the guard are formed in the connecting sleeve 3 of the funnel-shaped member 1. Alternatively, as illustrated in FIG. 5b, a slot 8' can be provided in the connecting sleeve 3 of the funnel-shaped member to permit the relative axial movement between the locking tongues 7 on the bearing ring 6 and the funnel-shaped member 1.

While specific embodiments of the invention have been shown and described in detail to illustrate the application of the inventive principles, it will be understood that the invention may be embodied otherwise without departing from such principles.

I claim:

1. A guard for enclosing a drive shaft assembly including a drive shaft and a universal joint connected to the drive shaft, comprising axially extending tubular means for laterally enclosing the drive shaft assembly, a bearing ring arranged to engage the drive shaft assembly so that it is secured against axial displacement on the assembly, said bearing ring having radially outwardly directed locking tongues, said tubular means includes a stop surface, said tubular means being axially displaceable over and relative to said bearing ring until said stop surface contacts said bearing ring, wherein the improvement comprises that said tubular means has axially extending passageways arranged to be aligned with and to receive said locking tongues so that said tubular means can be moved axially relative to said bearing ring with said locking tongues located within said passageways during such axial movement, said tubular means includes an axially extending funnel-shaped member, a tubular member, and an intermediate tubular part interconnecting said funnel-shaped member and said tubular member, said passageways being formed by said funnel-shaped member, said stop surface is formed on said intermediate tubular part, said funnel-shaped member having an end surface extending transversely of the axis thereof and spaced closely axially from and facing said stop surface, sand said funnel-shaped member being rotatable about the axis thereof from the position with said bearing ring in contact with said stop surface where said tongues aligned with said passageways to a position where said tongues are spaced angularly from said passageways and are located between said stop surface and said end surface on said funnel-shaped member, and said tubular means are held on the drive shaft assembly against axial displacement.

2. A guard, as set forth in claim 1, wherein said funnel-shaped member having outwardly extending projections therein defining said passageways arranged to be aligned with and to receive said locking tongues.

3. A guard, as set forth in claim 2, wherein said locking tongues are angularly spaced apart around said bearing ring and said projections are angularly spaced apart so that they can be aligned with said locking tongues.

4. A guard, as set forth in claim 1, wherein said funnel-shaped member having axially extending slots formed therein and forming said passageways arranged to be aligned with and to receive said locking tongues.

5. A guard, as set forth in claim 4, wherein said locking tongues are angularly spaced apart around said bearing ring, and said slots are angularly spaced apart so that they can be aligned with said locking tongues.

6. A guard, as set forth in claim 1, wherein said funnel-shaped member being rotatable relative to said intermediate tubular part so that said tubular means are held on the drive shaft assembly against axial displacement.

7. A guard, as set forth in claim 6, including means for securing said funnel-shaped member in the angularly displaced position where said passageways are out of alignment with said locking tongues.

* * * * *